No. 818,277. PATENTED APR. 17, 1906.
C. T. McELVANEY.
PISTON ROD CONNECTION.
APPLICATION FILED JUNE 2, 1905.
2 SHEETS—SHEET 1.
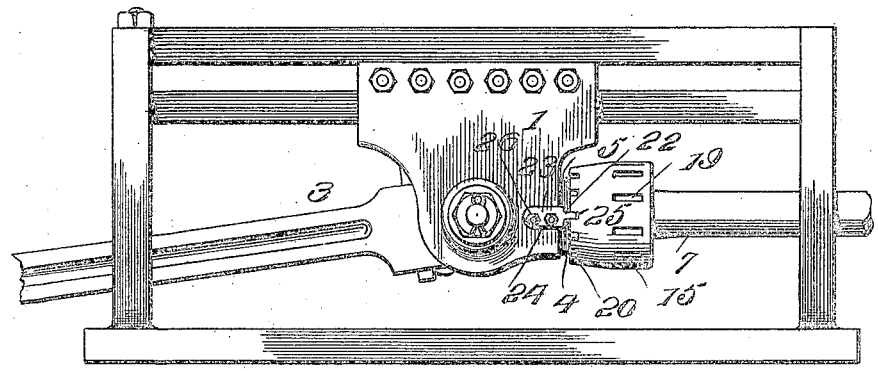
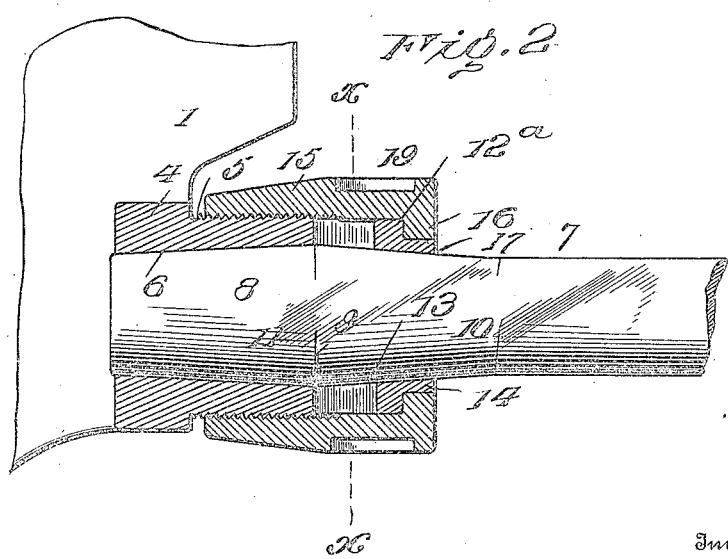
Witnesses
Louis H. Schmidt.
W. Withy Rossord.
Inventor
C. T. McElvaney
By
Attorney

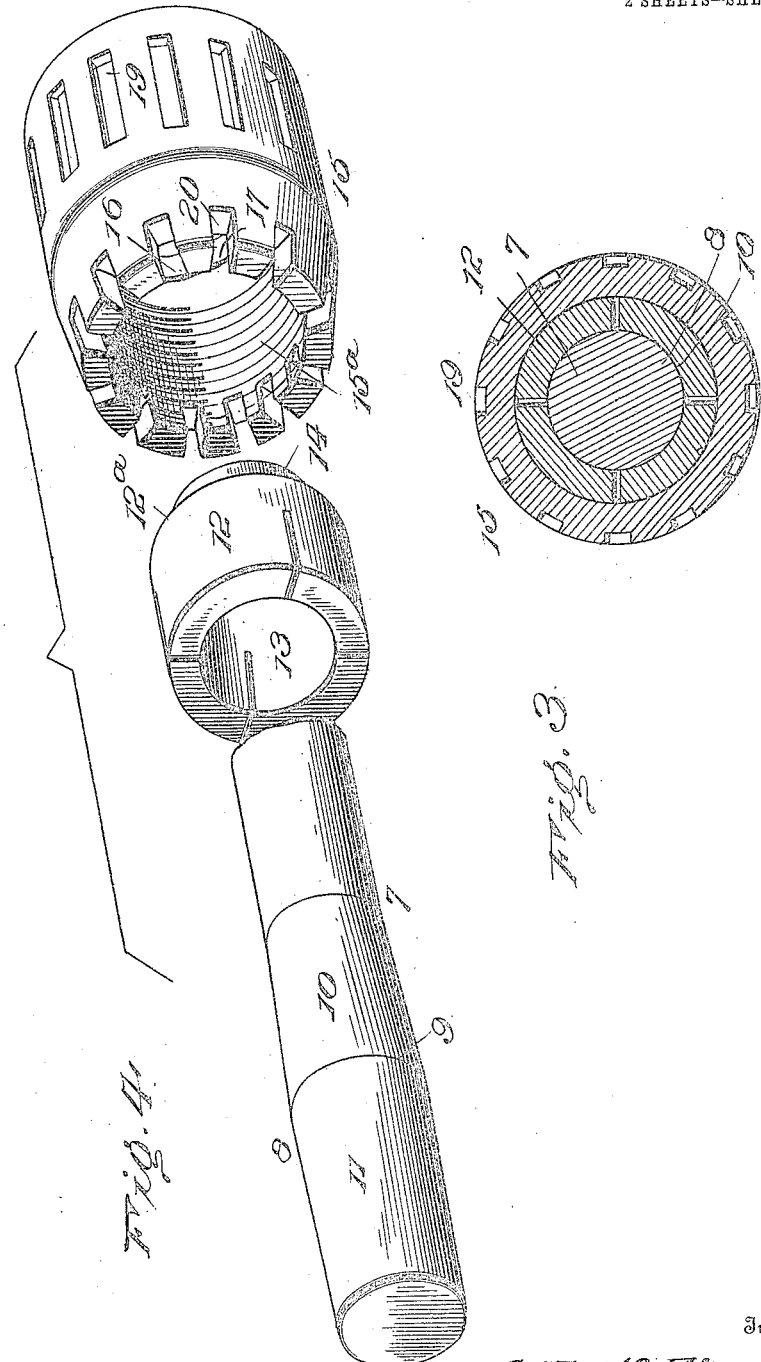

UNITED STATES PATENT OFFICE.

CHARLES T. McELVANEY, OF DENISON, TEXAS.

PISTON-ROD CONNECTION.

No. 818,277.     Specification of Letters Patent.     Patented April 17, 1906.

Application filed June 2, 1905. Serial No. 263,446.

*To all whom it may concern:*

Be it known that I, CHARLES T. McEL-VANEY, a citizen of the United States, residing at Denison, in the county of Grayson and State of Texas, have invented new and useful Improvements in Piston - Rod Connections, of which the following is a specification.

This invention relates to improvements in means for connecting a piston-rod of an engine to a cross-head.

Considerable difficulty has been experienced in making proper connection between a cross-head and a piston-rod on account of the customary practice of cutting a keyway through the end of the piston-rod. As there is a severe strain at this point and the keyway construction necessarily weakening the parts, frequent breaks occur and consequent damage. It is therefore of the utmost importance that the connection between the parts mentioned be of such construction as will do away with this defect at this point.

According to my invention I provide the piston-rod with a double taper and coöperating binder elements in line with the thrust of the piston-rod. I have found by connecting the parts with keys or otherwise the end thrust is so great that fracture soon develops and breaks occur, and to meet this obstacle I have devised the improvement now to be described.

In the drawings, Figure 1 is a view showing the application of my invention. Fig. 2 is an enlarged vertical section of the same. Fig. 3 is a transverse section on the line *x x*, Fig. 2. Fig. 4 is a view showing the various parts detached to more fully illustrate the details of construction.

The same numerals refer to like parts in all the figures.

1 represents a cross-head, and pivotally mounted thereon is a connecting-rod 3. A boss 4 projects from the cross-head, and it is provided with threads 5 and an opening 6, the latter tapering toward the connecting-rod.

7 indicates the piston-rod, which has an enlarged outer head 8, tapered in opposite directions from the point 9, forming what I shall hereinafter refer to as a "front" and "rear" taper 10 and 11. A split sleeve 12 has an opening 13, tapered to approximately correspond to taper 10 of the piston-rod and is provided with a reduced front end 14.

15 indicates a cast-steel nut provided with internal threads $15^a$ and an inwardly-extending flange 16, formed with an opening 17, through which the reduced end 14 of sleeve 12 passes. The outside of the nut is formed with a series of notches 19 to operate it when assembling the parts. A series of locking-notches 20 are formed on the rear edge of the nut to coöperate with a locking device 22. The locking device consists of a plate 23, formed with a tooth 25, the latter engaging one of the notches 20. Bolts 26 secure the locking-plate in position after the parts are properly set.

In operation the head of the piston-rod is placed in the tapered opening 6 of the boss, and the split nut is driven on the taper 10, after which the nut 15 is applied and as the threads engage the flange, acting on the shoulder $12^a$, spreads the split sleeve until its outer circumference contacts with the inner side of the nut. When this occurs, the binding action commences to take place as the nut is screwed on the boss, the sleeve "bites" hard on the head of the piston-rod and drives the taper 11 into the tapered opening of the boss until the parts are held tightly together.

The construction is such as to form a positive and secure connection, and by forming the double taper on the piston-rod each reciprocation of the piston serves to assist in binding the parts. After the nut has been properly driven the tooth 25 of the lock-plate is placed in one of the notches 20 and the bolts and nuts 26 tightened to hold it in place.

The invention is extremely simple and is admirably adapted for the purpose specified, especially so when it is considered that the end thrust is in alinement with the movement of the cross-head and piston-rod.

What I claim as new is—

1. In combination, a cross-head having a tapered opening, a piston-rod having a front and rear taper, the rear taper fitting the tapered opening in the cross-head, a split sleeve fitting over the front taper, and a binding-nut engaging the cross-head and binding the split sleeve on the front taper of the piston and also binding the rear taper against the wall of the tapered opening in the cross-head.

2. In combination, a cross-head having a threaded boss formed with a tapered opening, a piston-rod having a front and rear taper, a split sleeve formed with an opening, the rear taper of the piston-rod engaging the wall of the tapered opening of the boss and the front taper engaging the wall of the opening of the sleeve, a nut having threads and a flange, the threads engaging the threads of the boss and the flange engaging the split sleeve, whereby to bind the tapers of the piston-rod to the walls of the adjacent openings.

3. In combination, a cross-head formed with a tapered seat, a rod formed with a taper to correspond with the tapered seat in the cross-head and a second but reversed taper formed on said rod, a threaded portion extending from the cross-head, and means engaging the threaded portion to bind the second-mentioned tapered portion and force the first-mentioned taper in and hold it in its seat in the cross-head.

4. In combination, a cross-head formed with a threaded boss and tapered seat, a rod formed with a taper, a hollow threaded binding element engaging the threaded boss, and a split collar inclosed within the binding element and engaging the rod to cause the binding element to force the tapered rod into and hold it in the seat.

5. In combination, a cross-head formed with a threaded boss and a tapered seat, a piston-rod formed with two opposite tapers, one of which fits in the tapered seat in the cross-head, a nut engaging the threaded boss, and a binding element interposed between the nut and the second taper on the rod.

6. In combination, a cross-head, a piston-rod which is formed with a taper, means for binding one end of said piston-rod to the cross-head, a binding element encircling and engaging the taper of the piston-rod, and means engaging the binding element and the cross-head to force the binding element on the taper and hold the rod and cross-head together.

7. In combination, a cross-head, a piston-rod which is formed with two opposite tapers, a seat for one taper, a movable binding element formed with an opening through which the second taper passes, and means for forcing the binding element on its coöperating taper and the other taper in its seat, and means for locking the forcing means.

8. In combination, a cross-head having a threaded boss and a tapered seat, a piston-rod formed with opposite tapering surfaces one of which engages the tapered seat, a binding element engaging the second-mentioned tapered surface, an internally-threaded nut engaging the threaded boss for forcing the binding element on the tapered portion and the other tapered surface in its seat, and a detachable projection which engages notches formed in the nut to lock the parts together.

In testimony whereof I affix my signature in presence of two subscribing witnesses.

CHARLES T. McELVANEY.

Witnesses:
J. E. HOWARD,
E. MATLEY.